US010623493B2

(12) United States Patent
Hoernes et al.

(10) Patent No.: US 10,623,493 B2
(45) Date of Patent: Apr. 14, 2020

(54) PROCESSING OF NETWORK COMMUNICATION BETWEEN A TELECOMMUNICATIONS NETWORK AND AT LEAST ONE USER EQUIPMENT VIA REALIZING, WITHIN THE TELECOMMUNICATIONS NETWORK, NETWORK FUNCTIONS VIRTUALIZATION

(71) Applicant: Deutsche Telekom AG, Bonn (DE)

(72) Inventors: Andreas Hoernes, Sankt Augustin (DE); Fridtjof van den Berge, Bonn (DE)

(73) Assignee: DEUTSCHE TELEKOM AG, Bonn (DE)

( * ) Notice: Subject to any disclaimer, the term of this patent is extended or adjusted under 35 U.S.C. 154(b) by 363 days.

(21) Appl. No.: 15/490,948

(22) Filed: Apr. 19, 2017

(65) Prior Publication Data

US 2017/0310755 A1 Oct. 26, 2017

(30) Foreign Application Priority Data

Apr. 20, 2016 (EP) .................................... 16166231

(51) Int. Cl.
*G06F 15/16* (2006.01)
*H04L 29/08* (2006.01)
(Continued)

(52) U.S. Cl.
CPC ...... *H04L 67/1097* (2013.01); *H04L 41/0668* (2013.01); *H04L 41/0853* (2013.01);
(Continued)

(58) Field of Classification Search
CPC ......... H04L 67/06; H04L 67/16; H04L 67/10; H04L 67/306; H04L 41/0677;
(Continued)

(56) References Cited

U.S. PATENT DOCUMENTS

2011/0044438 A1* 2/2011 Wang .................. H04L 65/4015
379/93.02
2013/0005311 A1* 1/2013 Lozinski ............. H04L 41/0677
455/414.1

(Continued)

FOREIGN PATENT DOCUMENTS

| CN | 103167040 A | 6/2013 |
| CN | 104253866 A | 12/2014 |
| WO | WO 2015187069 A1 | 12/2015 |

OTHER PUBLICATIONS

"Network Functions Virtualisation (NFV); Reliability; Report on Models and Features for End-to-End Reliability", Group Specification, European Telecommunications Standards Institute (ETSI), vol. NFV REL, No. V1.1.1, Apr. 1, 2016 (Apr. 1, 2016), XP014274011.

(Continued)

*Primary Examiner* — Farzana B Huq

(74) *Attorney, Agent, or Firm* — Leydig, Voit & Mayer, Ltd.

(57) ABSTRACT

A method for processing of network communication between a telecommunications network and at least one user equipment includes: subscription data, session data and/or call state data required to be available to at least a first virtual network function instance are transmitted, by a shared database functionality, to the first virtual network function instance; in case of at least a change being applied to the subscription data, session data and/or call state data, the changed subscription data, session data and/or call state data or an updated version of the subscription data, session data and/or call state data is transmitted, by the first virtual network function instance, to the shared database functionality; and in case of a failure of and/or a transfer of the functionality of the first virtual network function instance, a second virtual network function instance resumes the functionality of the first virtual network function instance.

10 Claims, 2 Drawing Sheets

(51) Int. Cl.
*H04L 12/24* (2006.01)
*H04L 29/06* (2006.01)

(52) U.S. Cl.
CPC ...... *H04L 41/5051* (2013.01); *H04L 65/1069* (2013.01); *H04L 67/2842* (2013.01); *H04L 41/082* (2013.01); *H04L 41/0896* (2013.01)

(58) Field of Classification Search
CPC ............. H04L 41/0896; H04L 41/5087; H04L 41/509; H04L 65/1013; H04L 65/4015
USPC .................................. 709/211, 223, 226–227
See application file for complete search history.

(56) References Cited

U.S. PATENT DOCUMENTS

2016/0330330 A1* 11/2016 Bindrim .............. H04L 65/1013
2018/0191569 A1* 7/2018 Hoffmann ............. H04W 24/02

OTHER PUBLICATIONS

Taleb Tarik et al: "On Service Resilience 1-13 in Cloud-Native 5G Mobile Systems", IEEE Journal on Selected Areas in Communications, IEEE Service Center, vol. 34, No. 3, Mar. 1, 2016 (Mar. 1, 2016), pp. 483-496, XP011602758.

"Network Function Virtualisation (NFV); Reliability: Report on Scalable Architectures for Reliability Management; NFVREL (15)000176_REL002v011_diffmarked", ETSI Draft; NFVREL (15)000176_REL002V011_DIFFMARKED, European Telecommunications Standards Institute (ETSI), vol. ISG—NFV, Jul. 29, 2015 (Jul. 29, 2015), pp. 1-36, XP014256167.

ETSI GS NFV-REL 003 V1.1.1 (Apr. 2016), "Network Functions Virtualisation (NFV); Reliability; Report on Models and Features for Ent-to-End Reliability", Apr. 2016, pp. 1-105.

* cited by examiner

PROCESSING OF NETWORK COMMUNICATION BETWEEN A TELECOMMUNICATIONS NETWORK AND AT LEAST ONE USER EQUIPMENT VIA REALIZING, WITHIN THE TELECOMMUNICATIONS NETWORK, NETWORK FUNCTIONS VIRTUALIZATION

CROSS-REFERENCE TO RELATED APPLICATIONS

Priority is claimed to European Patent Application No. EP 16166231.7, filed on Apr. 20, 2016, the entire disclosure of which is hereby incorporated by reference herein.

FIELD

The present invention relates a method for an improved processing of network communication between a telecommunications network and at least one user equipment via realizing, within the telecommunications network, network functions virtualization, wherein the telecommunications network provides a plurality of communication services to the user equipment, wherein the telecommunications network comprises at least one application server functionality, wherein the application server functionality is realized via a plurality of virtual network function instances, wherein the telecommunications network furthermore comprises a shared database functionality.

Furthermore, the present invention relates to a telecommunications network for an improved processing of network communication between the telecommunications network and at least one user equipment via realizing, within the telecommunications network, network functions virtualization, wherein the telecommunications network provides a plurality of communication services to the user equipment, wherein the telecommunications network comprises at least one application server functionality, wherein the application server functionality is realized via a plurality of virtual network function instances.

Furthermore, the present invention relates to a program and a computer program product.

BACKGROUND

In the last years, an increasing extension of telecommunications networks took place all over the world, e.g. of wire line communication networks or of wireless communication networks, such as broadband networks, the Internet and other packet based networks based e.g. on the Internet Protocol (IP), Ethernet, MPLS/GMPLS (Multiprotocol Label Switching/Generalized Multiprotocol Label Switching) or related technologies (e.g. using optical transmission based on SDH/SONET (Synchronous Digital Hierarchy/Synchronous Optical Networking) and/or WDM/DWDM (Wavelength Division Multiplexing/Dense Wavelength Division Multiplexing)), or such as the cdma2000 (code division multiple access) system, cellular 3rd generation (3G) communication networks like the Universal Mobile Telecommunications System (UMTS), enhanced (or cellular 4th generation (4G)) communication networks based e.g. on Long term evolution (LTE), cellular 2nd generation (2G) communication networks, or other wireless communication system, such as the Wireless Local Area Network (WLAN) or Worldwide Interoperability for Microwave Access (Wi-MAX).

Recent technology progress deals with network virtualization, the use of which promises additional flexibility, especially regarding scalability and or fast service implementation of new communication services, and offers opportunities for deploying future network architectures. Basically, network virtualization is a concept to create logical network resources, e.g. virtual nodes and virtual links, which form a virtual network, from physical resources.

SUMMARY

In an exemplary embodiment, the present invention provides a method for processing of network communication between a telecommunications network and at least one user equipment via realizing, within the telecommunications network, network functions virtualization. The telecommunications network provides a plurality of communication services to the at least one user equipment. The telecommunications network comprises at least one application server functionality realized via a plurality of virtual network function instances. The telecommunications network furthermore comprises a shared database functionality. In order for the telecommunications network to provide a specific communication service out of the plurality of communication services to the user equipment—subscription data, session data and/or call state data are required to be available to at least a first virtual network function instance out of the plurality of virtual network function instances. The method includes the steps of: in a first step, the subscription data, session data and/or call state data required to be available to at least the first virtual network function instance are transmitted, by the shared database functionality, to the first virtual network function instance; in a second step, subsequent to the first step and in case of at least a change being applied to the subscription data, session data and/or call state data, the changed subscription data, session data and/or call state data or an updated version of the subscription data, session data and/or call state data is transmitted, by the first virtual network function instance, to the shared database functionality; and in a third step, subsequent to the second step and in case of a failure of the first virtual network function instance, and/or in case of a transfer of the functionality of the first virtual network function instance, a second virtual network function instance out of the plurality of virtual network function instances resumes the functionality of the first virtual network function instance, using the changed subscription data, session data and/or call state data or the updated version of the subscription data, session data and/or call state data.

BRIEF DESCRIPTION OF THE DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following.

DETAILED DESCRIPTION

Figure 1:
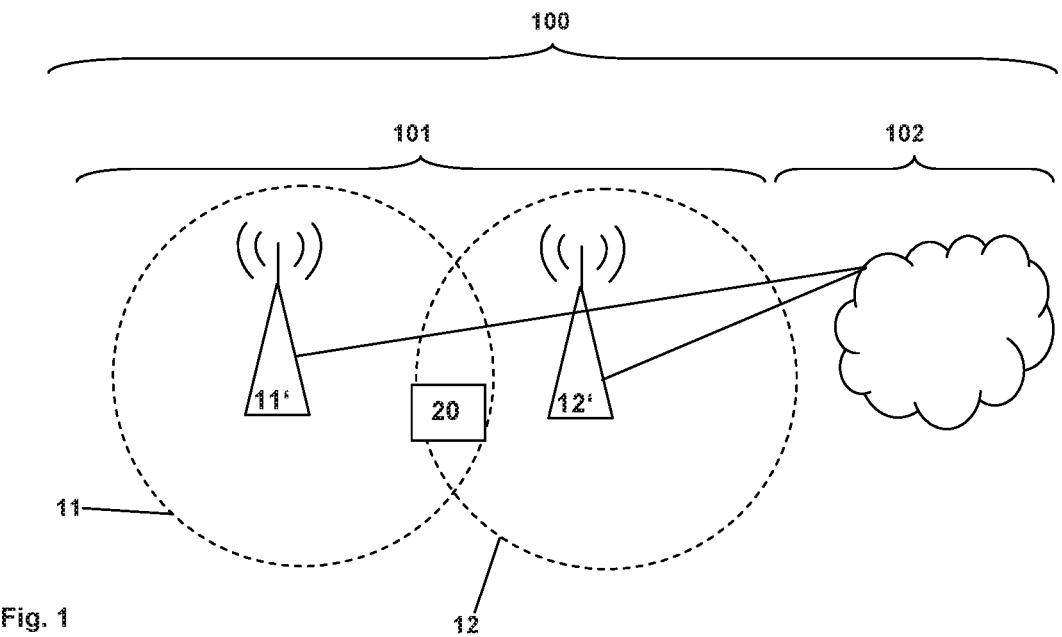
FIG. 1 schematically illustrates a mobile communication network as an example of a telecommunications network in an exemplary embodiment with a first base station entity, and a second base station entity, a user equipment, a core network, and an access network.

Network virtualization technology is typically realized by a service layer within the telecommunications network that exposes cloud services. Such cloud services are typically used by Open Systems Interconnection ("OSI") communication model layer 4-7 services. Such cloud services can be used by a service provider, such as, but not limited to, a telecommunication service provider that provides communication services to users of the telecommunications network, such as voice over long-term evolution ("VoLTE"), video communications, and/or other "real-time" services. In this context, "Real-time" typically means communication services having or requiring latency times that can be measured in milliseconds/microseconds allowing for responsiveness levels used to support the low timing threshold for such communication services, especially involving session initiation protocol ("SIP") queries and responses, and the like.

Network virtualization technology requires hardware resources on which the cloud services are able to operate. The cloud services typically include a database service, or a database functionality which is also called—within the context of the present invention—a shared database functionality. Furthermore, the cloud services can include (but are not limited to) one or a plurality of application server functionalities. The application server functionalities are typically delivered by virtual network function instances, i.e. virtual machines or applications within virtual machines, running on physical machines, i.e. hardware resources. While providing communication services of the telecommunications network (or while being involved (especially together with other network nodes and/or entities and/or application server functionalities) in providing communication services of the telecommunications network, the virtual network function instances and/or the virtual machine they are running on typically comprise or store subscription data (typically of the user equipment served by the communication services provided), session data (typically of the communication session invoked by the user equipment in question) and/or call state data (of the call or communication session involved). A part of these data—typically the subscription data—are more or less static and are conventionally stored in a database such as a home subscriber server or the like. Hence, in case of a failure of a virtual network function instance (and/or the corresponding virtual machine) or in case of other reasons that a specific virtual network function instance shall stop performing a specific application server functionality (e.g. due to a reorganization of physical and/or virtual resources due to a scaling operation within the telecommunications network), the subscription data can be easily retrieved—by another virtual network function instance—from the corresponding database in order for the other virtual network function instance to provide the application server functionality in question. However, another part of these data—typically (a part or all of) the call state data and/or (a part or all of) the session data—are typically relatively dynamic, i.e. they change, e.g., in the course of the communication service being provided to the user equipment. Hence, in case of a failure of the virtual network function instance or in case that the virtual network function instance stops (or shall stop) performing a specific application server functionality, the highly dynamic data—especially at least part of the call state data and/or at least part of the session data—might be lost, leading either to an interruption of the communication service provided to the user equipment or at least to a delay in providing the communication service. In this respect, the virtual network function instance corresponds to a single point of failure, at least with regard to the communication service provided to the user equipment.

Exemplary embodiments of the present invention provide a technically simple, effective and cost effective solution for an improved processing of network communication between a telecommunications network that realizes network functions virtualization, and at least one user equipment, wherein virtual network function instances acting as a single point of failure, at least regarding session data and/or call state data, is avoided as much as possible. Further exemplary embodiments of the present invention provide a corresponding telecommunications network.

In an exemplary embodiment, the present invention provides a method for an improved processing of network communication between a telecommunications network and at least one user equipment via realizing, within the telecommunications network, network functions virtualization, wherein the telecommunications network provides a plurality of communication services to the user equipment, wherein the telecommunications network comprises at least one application server functionality, wherein the application server functionality is realized via a plurality of virtual network function instances, wherein the telecommunications network furthermore comprises a shared database functionality, wherein—in order for the telecommunications network to provide a specific communication service, out of the plurality of communication services, to the user equipment—subscription data, session data and/or call state data are required to be available to at least a first virtual network function instance out of the plurality of virtual network function instances, wherein the method comprises the steps of:

in a first step, the subscription data, session data and/or call state data—required by the first virtual network function instance out of the plurality of virtual network function instances—are transmitted, by the shared database functionality, to the first virtual network function instance out of the plurality of virtual network function instances, in a second step, subsequent to the first step and in case of at least a change being applied to the subscription data, session data and/or call state data, the changed subscription data, session data and/or call state data or an updated version of the subscription data, session data and/or call state data is transmitted, by the first virtual network function instance out of the plurality of virtual network function instances, to the shared database functionality, in a third step, subsequent to the second step and
    in case of a failure of the first virtual network function instance out of the plurality of virtual network function instances, and/or
    in case of a transfer of the functionality of the first virtual network function instance out of the plurality of virtual network function instances, especially due to scaling effects or scaling measures within the telecommunications network,
a second virtual network function instance out of the plurality of virtual network function instances resumes the functionality of the first virtual network function instance, using the changed subscription data, session data and/or call state data or the updated version of the subscription data, session data and/or call state data.

It is thereby advantageously possible according to the present invention that the virtual network function instances can be realized—via realizing the shared database functionality—such that such virtual network function instances, and hence the corresponding application server functionalities, can be performed in a stateless or at least nearly stateless manner.

Advantages of the present invention include all data having a persistent state, till renewed, in the centralized database (i.e. in the shared database functionality), which could be set-up with virtual nodes. Thus it is possible—and desirable to leave all connected virtualized network function (VNF)-nodes (i.e. the virtual network function instances) in a stateless state (or in an external resilient state, i.e. the subscription data, the session data and/or the call state data are in stateful resiliency which ensures that nothing is lost in case of scaling operations (in or out scaling) and in case of failures, hence compliance with ETSI GS NFV R001 Resiliency Requirements). As such, the VNF-nodes (i.e. the virtual network function instances), which are in a stateless or in an external resilient state, do reflect the relevant data versions of a specific or current moment of a centralized database (i.e. the shared database functionality as well as multi-tenancy).

The VNF-nodes can differentiate (or can be differentiated) in, for instance, a certain application, condition, region, service, status, etc. for which they are applicable and/or responsible (i.e. virtual network function instances can be different in the sense that they may relate to different application server functionalities) and each virtual network function instance is able to restrict or to provide the permission on its specific data.

Preferably according to the present invention, the shared database functionality (or shared database layer), does not only have the centralized subscription data (3GPP 23.335), but is also able to support the various and appropriate protocols, as, e.g., a Lightweight Directory Access Protocol (LDAP), the specific Mobile Application Part (MAP), Remote Authentication Dial In User Service (RADIUS), Reliable Autonomic Distributed Object Store (RADOS) and/or Representational State Transfer (REST).

Hence according to the present invention, many causes of network failures have a much lower impact on any connectivity, as a sufficient scaled redundancy in the established connectivities is assured. This contributes to an enhanced service level regarding communication services within the telecommunications network, and may even be noticed by a user of the user equipment.

As with the last, the requirement to reach a much lower signaling by server within a network is set. As such the network's cabling and other transmission-techniques will get a lower load to handle, as e.g. virtual instances of the centralized database take over functionalities of former dedicated hardware at a certain physical site. As is in most cases, the various services, their security-provisions and gateways may just be a few examples which could portrait likely transmission links between sites of a network. This is especially the case, as complex services may use various entities to provide all the needed data on for instance needed authorization, firewall, monitoring and management, provision on cryptographic keys, provision on data, provision and maintaining a virtual private network (VPN), proxy, etc. This means that by realizing the centralization as well as the shared database functionality (also providing call state data), it is advantageously possible according to the present invention that less hardware as well as less TCO, and less signalization is requires (for an otherwise equal performance). By reducing the signalization efforts, it is also possible to reduce other load such as security requirement or the like.

By performing the virtual network function instances and the corresponding application server functionality in a stateless or at least nearly stateless manner—i.e. via realizing the shared database functionality—it is advantageously possible, according to the present invention, to comparatively easily avoid a single point of failure and provide redundancy, to provide the possibility of failure recovery, as well as to provide an enhanced level and ease of scalability within the telecommunications network.

The telecommunications network according to the present invention might be a fixed-line telecommunications network or a mobile communication network. However, it is not excluded according to the present invention to implement an exemplary embodiment of the inventive method in a telecommunications network having both aspects (or parts) of a fixed-line telecommunications network (or being a fixed-line telecommunications network in such parts) and aspects (or parts) of a mobile communication network (or being a mobile communication network in such parts); such networks are also known under the term fixed-mobile-convergence networks (FMC networks).

Exemplary embodiment of the invention provide an enhanced communication service towards a plurality of user equipments connected to or otherwise related to the telecommunications network.

According to the present invention, the communication exchange between, on the one hand, the telecommunications network, and, on the other hand, the user equipment (but preferably the plurality of user equipments) is based on the transmission and reception of data packets between the telecommunications network and the at least one user equipment.

In order to handle the traffic from and to the at least one user equipment (but typically a multitude of user equipments), the telecommunications network comprises a plurality of gateway entities. Such gateway entities might be implemented as virtual network function instances related to or realizing application server functionalities (i.e. such gateway entity functionalities are examples of application server functionalities, especially together with other application server functionalities deployed within the telecommunications network), or these gateway entities might be realized via conventional network nodes within the telecommunications network (i.e. typically in the form of hardware nodes dedicated to the functionality of such gateway entities), and other network nodes of the telecommunications network are realized via virtual network function instances (providing application server functionalities).

In any case, the telecommunications network is typically able to provide a plurality of communication services to the user equipment (but preferably to a plurality of user equipments), wherein the telecommunications network comprises at least one application server functionality (but likewise preferably a plurality of application server functionalities). Each application server functionality (of preferably the plurality of application server functionalities) is realized via a plurality of virtual network function instances.

According to the present invention, the telecommunications network furthermore comprises a shared database functionality. The shared database functionality comprises (or is able to access or retrieve) subscription data, session data and/or call state data that are typically required to provide a specific communication service, out of the plurality of communication services, to the user equipment. Typically, such subscription data, session data and/or call state data are required to be available to the one virtual network function instance (out of the plurality of virtual network function instances associated to (or being able to provide) a specific application server functionality) handling the associated requests and messages for performing the considered communication service requested by the user equipment considered—this one virtual network function instance is also referred to by the designation "first virtual network function instance".

According to an exemplary embodiment of the inventive method of the present invention, in a first step, the subscription data, session data and/or call state data—required by the first virtual network function instance—are transmitted, by the shared database functionality, to the first virtual network function instance; hence the first virtual network function instance is assigned to handle certain requests (issued by the user equipment or by other network nodes of the telecommunications network in respect of the communication services invoked or requested by the user equipment) or messages.

In a second step, subsequent to the first step (i.e. while the first virtual network function instance having been assigned to be involved in handling or providing the communication service to the user equipment) and in case of at least a change being applied to the subscription data, session data and/or call state data, the changed subscription data, session data and/or call state data or an updated version of the subscription data, session data and/or call state data is transmitted, by the first virtual network function instance, to the shared database functionality. The subscription data, session data and/or call state data might relate to more or less static parts (primarily but not necessarily limited to subscription data and/or session data), and to more or less dynamic parts (primarily but not necessarily limited to session data and/or call state data). The more or less static parts of the subscription data, session data and/or call state data are typically stored in a database anyway; however, the more dynamic such data (especially the session data and/or the call state data) are (i.e. potentially changing on a comparatively short time scale of, say, minutes, seconds, or even milliseconds or microseconds), the greater will be the data transmission requirements to transmit such updated data (i.e. subscription data, session data and/or call state data) from the first virtual network function instance to the shared database functionality. According to the present invention, the changed subscription data, session data and/or call state data (or at least the changed part thereof, e.g. in the sense of incrementally transmitting only those data changed or even only the changes themselves) or an updated version of those data is transmitted. Via such data transmission towards the shared database functionality, it is advantageously possible, according to the present invention, that the shared database functionality comprises (virtually at any time or more or less at any time, i.e. at very close time intervals) an up to date copy or version of the subscription data, session data and/or call state data, providing the possibility that such a copy or version of the subscription data, session data and/or call state data can be reused—by a second virtual network function instance—if need be, and especially without interruption or serious delay (or any additional delay, recognizable by the user of the user equipment) of the communication service requested by the user equipment.

Hence in a third step (subsequent to the second step), it is supposed that the first virtual network function instance needs to handover its involvement in handling (or providing) the communication service (with respect to the user equipment) to the second virtual network function instance. The reasons for such required handover potentially range from a failure of the first virtual network function instance (or the physical machine or physical machine cluster supporting the first virtual network function instance) to other reasons within the telecommunications network, especially related to organizational changes, especially regarding the assignment of different virtual network function instances to different sections or parts of the telecommunications network, especially related to reasons scalability of (or within) the telecommunications network. Hence according to the present invention, especially in case of a failure of the first virtual network function instance and/or in case of a transfer of the functionality of the first virtual network function instance—especially due to scaling effects or scaling measures within the telecommunications network—the second virtual network function instance resumes the functionality of the first virtual network function instance, thereby using the changed subscription data, session data and/or call state data or the updated version of the subscription data, session data and/or call state data that are available by (or within) the shared database functionality.

Hence according to the present invention, it is advantageously possible that the (application server) functionality of the first virtual network function instance is continued by the second virtual network function instance without failure or serious delay in providing the requested communication service.

According to the present invention, it is preferred that the subscription data (also called profile data) are stored in a geo-redundant manner (i.e. at different locations that are geographically distinct, i.e. not only logically redundant, but perhaps stored in one and the same physical location, e.g. within the same hard-disk or within the same server cluster or within the same datacenter) and with synchronous replication (i.e. all committed data on the memory location (typically a disk or an solid state drive (SSD)) of the source server entity are on the memory location of the destination server), especially with a geo-redundancy level of three (i.e. three copies of the subscription data exist within the telecommunications network at different geographical locations), and optionally with local redundancy. Furthermore, it is preferred that session data are also stored in a geo-redundant manner and with also synchronous replication or with asynchronous replication (i.e. data on the memory location of the source server entity can be lost in case of failure), especially with a geo-redundancy level of two (i.e. two copies of the subscription data exist within the telecommunications network at different geographical locations), and likewise optionally with local redundancy. Furthermore call state data are stored in a locally redundant asynchronous manner.

According to a preferred embodiment of the present invention, the call state data relate to the specific communication service of a call or a communication session being initiated, received and/or maintained by the user equipment, wherein especially the call state data are modified in the course of the call or communication session.

As detailed above, it is thereby advantageously possible to continue the (application server) functionality of the first virtual network function instance by the second virtual network function instance without failure or serious delay in providing the requested communication service.

According to a further preferred embodiment of the present invention, the plurality of virtual network function instances are stateless virtual network function instances, wherein especially in case of a failure of one of the plurality of virtual network function instances, another of the plurality of virtual network function instances resumes its functionality via a sort of handover procedure—especially of the call state data—between the virtual network function instances involved.

Thereby, it is advantageously possible that that by frequently transmitting any changes to the subscription data, session data and/or call state data, used by the first virtual network function instance and/or modified by the first virtual network function instance itself, to the shared database functionality, the handover procedure (towards the second virtual network function instance) is able to be realized, and hence the provision of the communication service continued.

According to still a further preferred embodiment (second embodiment) of the present invention, the plurality of virtual network function instances comprise cached information, wherein the cached information relates to the changed or updated subscription data, session data and/or call state data, and especially related to changed or updated call state data.

Thereby, it is advantageously possible to avoid to transmit each and every change of the subscription data, session data and/or call state data—at least immediately when or after such a change occurs or is applied to the subscription data, session data and/or call state data—to the shared database functionality, hence avoiding the requirement to use an important transmission bandwidth between the first virtual network function instance and the shared database functionality. However, even though not each and every change of the subscription data, session data and/or call state data is immediately transmitted, by the first virtual network function instance, to the shared database functionality on a comparatively small time scale, such changes are nevertheless transmitted to the shared database functionality (albeit on a larger time scale, i.e. typically less frequently), and the availability of such changes (or updated versions) of the subscription data, session data and/or call state data at the shared database functionality (and hence also at the second virtual network function instance if need be, i.e. typically in case of failure of the first virtual network function instance or in case of a transfer of the functionality of the first virtual network function instance) allows for a continuation of the (application server) functionality of the first virtual network function instance by the second virtual network function instance.

Furthermore, according to an embodiment of the present invention, it is preferred that the shared database functionality provides a single point of provisioning and ensures data consistency by one single logical entity of truth.

According to a further preferred embodiment of the present invention, the telecommunications network comprises—besides the application server functionality—further application server functionalities, wherein each of the further application server functionalities is realized via a plurality of virtual network function instances.

Furthermore, the present invention relates to a telecommunications network for an improved processing of network communication between the telecommunications network and at least one user equipment via realizing, within the telecommunications network, network functions virtualization, wherein the telecommunications network provides a plurality of communication services to the user equipment, wherein the telecommunications network comprises at least one application server functionality, wherein the application server functionality is realized via a plurality of virtual network function instances, wherein the telecommunications network furthermore comprises a shared database functionality, wherein—in order for the telecommunications network to provide a specific communication service, out of the plurality of communication services, to the user equipment—subscription data, session data and/or call state data are required to be available to at least a first virtual network function instance out of the plurality of virtual network function instances, wherein the telecommunications network is configured such that:

the shared database functionality transmits the subscription data, session data and/or call state data—required by the first virtual network function instance out of the plurality of virtual network function instances—to the first virtual network function instance out of the plurality of virtual network function instances, in case of at least a change being applied to the subscription data, session data and/or call state data, the first virtual network function instance out of the plurality of virtual network function instances transmits the changed subscription data, session data and/or call state data or an updated version of the subscription data, session data and/or call state data to the shared database functionality, in case of
a failure of the first virtual network function instance out of the plurality of virtual network function instances, and/or
a transfer of the functionality of the first virtual network function instance out of the plurality of virtual network function instances, especially due to scaling effects or scaling measures within the telecommunications network, a second virtual network function instance out of the plurality of virtual network function instances resumes the functionality of the first virtual network function instance, using the changed subscription data, session data and/or call state data or the updated version of the subscription data, session data and/or call state data.

According to the present invention—and especially with regard to the telecommunications network but not limited thereto—it is especially preferred that the call state data relate to the specific communication service of a call or a communication session being initiated, received and/or maintained by the user equipment, wherein especially the call state data are modified in the course of the call or communication session.

According to the present invention—and especially with regard to the telecommunications network but not limited thereto—it is furthermore preferred that the plurality of virtual network function instances are stateless virtual network function instances, wherein especially in case of a failure of one of the plurality of virtual network function instances, another of the plurality of virtual network function instances resumes its functionality via a sort of handover procedure—especially of the call state data—between the virtual network function instances involved.

Furthermore according to the present invention—and especially with regard to the telecommunications network but not limited thereto—it is preferred that the plurality of virtual network function instances comprise cached information, wherein the cached information relates to the changed or updated subscription data, session data and/or call state data, and especially related to changed or updated call state data.

Furthermore according to the present invention—and especially with regard to the telecommunications network but not limited thereto—it is preferred that the telecommunications network comprises a plurality of physical machines located in a plurality of data centers, wherein the virtual network function instances and/or the shared database functionality are supported by the physical machines within the plurality of data centers, wherein the shared database functionality especially involves the data centers being located in a geographically distributed manner.

Still additionally, the present invention relates to a program comprising a computer readable program code which, when executed on a computer and/or on a physical machine and/or on a virtual network function instance and/or on a network component of a telecommunications network or in part on a physical machine and/or in part on a virtual network function instance and/or in part on a network component of the telecommunications network, causes the computer and/or the physical machine and/or the virtual network function instance and/or the network component of the telecommunications network to perform an exemplary embodiment of the inventive method.

Furthermore, the present invention relates to a computer program product for an improved processing of network communication between a telecommunications network and at least one user equipment via realizing, within the telecommunications network, network functions virtualization, the computer program product comprising a computer program stored on a storage medium, the computer program comprising program code which, when executed on a computer and/or on a physical machine and/or on a virtual network function instance and/or on a network component of a telecommunications network or in part on a physical machine and/or in part on a virtual network function instance and/or in part on a network component of the telecommunications network, causes the computer and/or the physical machine and/or the virtual network function instance and/or the network component of the telecommunications network to perform an exemplary embodiment of the inventive method.

These and other characteristics, features and advantages of the present invention will become apparent from the following detailed description, taken in conjunction with the accompanying drawings, which illustrate, by way of example, the principles of the invention. The description is given for the sake of example only, without limiting the scope of the invention. The reference figures quoted below refer to the attached drawings.

The present invention will be described with respect to particular embodiments and with reference to certain drawings but the invention is not limited thereto but only by the claims. The drawings described are only schematic and are non-limiting. In the drawings, the size of some of the elements may be exaggerated and not drawn on scale for illustrative purposes.

Where an indefinite or definite article is used when referring to a singular noun, e.g. "a", "an", "the", this includes a plural of that noun unless something else is specifically stated.

Furthermore, the terms first, second, third and the like in the description and in the claims are used for distinguishing between similar elements and not necessarily for describing a sequential or chronological order. It is to be understood that the terms so used are interchangeable under appropriate circumstances and that the embodiments of the invention described herein are capable of operation in other sequences than described or illustrated herein.

In FIG. 1, a telecommunications network 100, especially a public land mobile network, is schematically shown in an exemplary embodiment. In the exemplary embodiment of FIG. 1, the telecommunications network 100 comprises an access network 101 and a core network 102. The core network 102 is only schematically shown by means of a cloud representation. The telecommunications network 100 is preferably a cellular telecommunications network comprising typically a plurality of network cells or radio cells, two of which are represented in FIG. 1 by means of a dashed line and reference signs 11 (first radio cell) and 12 (second radio cell). In the telecommunications network 100, typically a plurality of user equipments (only one of which is schematically shown and represented by reference sign 20) are camping on the telecommunications network 100 within network cells 11, 12, i.e. the user equipments are connected or are camping on a first gateway entity 11', the first gateway entity 11' serving the first radio cell 11, or on a second gateway entity 12', the second gateway entity 12' serving the second radio cell 12. The first and second gateway entities 11', 12' are typically base station entities, typically base transceiver stations, e.g. an eNodeB in case of LTE.

Figure 2:
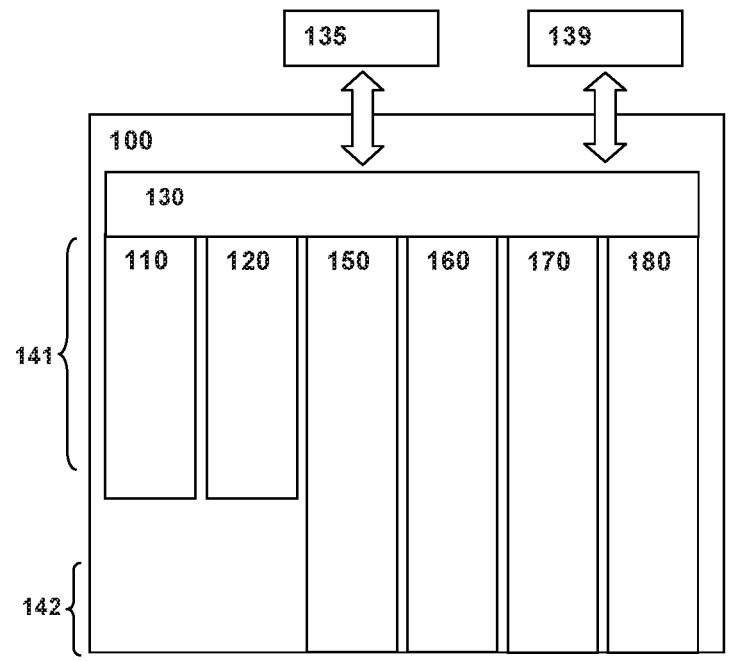
FIG. 2 schematically illustrates a telecommunications network comprising a shared database functionality according to the present invention.

In FIG. 2, the telecommunications network 100 comprising a shared database functionality 130 according to the present invention is schematically shown. In the exemplary embodiment shown in FIG. 2, the shared database functionality 130 comprises or is able to communicate with a single point of provisioning 135, especially for subscription data, typically related to user equipments 20. In the exemplary embodiment shown in FIG. 2, the shared database functionality 130 additionally comprises an analytics interface 139. According to the present invention, the telecommunications network 100 comprises a backend data center control plane 141 and an FDC (Frontend Data Center) user plane 142. Furthermore, the telecommunications network 100 comprises (and the shared database functionality 130 is connected to or is able to access) a certain number of application server functionalities. Examples of such application server functionalities include (but are not limited to):

a User Profile Domain 110,
an Application Server Domain 120,
a number of core virtual network functions, such as the SBC 150 (Session Border Controller),
the ePC 160 (enhanced Packet Core),
the IMS Core 170 (Internet Multimedia Subsystem Core), and
the CS part 180 (Circuit Switched part).

The User Profile Domain 110 typically comprises functionalities such as HLR (Home Location Register), HSS (Home Subscriber Server) (both for the enhanced packet core as for the Internet Multimedia Subsystem), VLR (Visitor Location Register), MMTel (Multimedia Telephony), and CCS (Call Control Server (IMS AS)). The Application Server Domain 120 typically comprises functionalities such as MSG-AS, AAA (Authentication, Authorization and Accounting), PCRF (Policy and Charging Rules Function), ENUM (E.164 NUmber Mapping, Telephone Number Mapping), and other functionalities.

Figure 3:
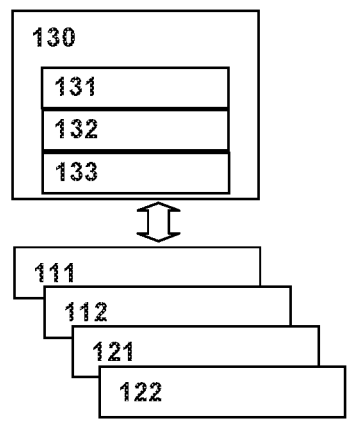
FIG. 3 schematically shows communication between a shared database functionality, on the one hand, and a plurality of virtual network function instances, on the other hand, illustrating a first embodiment of the present invention.
Figure 4:
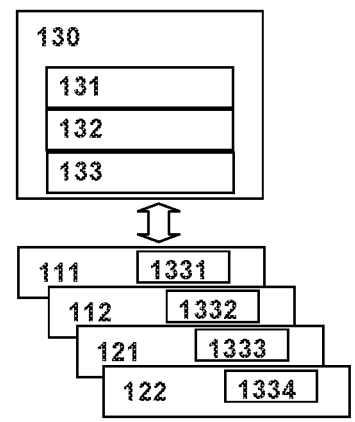
FIG. 4 schematically shows communication between a shared database functionality, on the one hand, and a plurality of virtual network function instances, on the other hand, illustrating a second embodiment of the present invention.

In FIG. 3, the communication or the interworking between the shared database functionality 130, on the one hand, and a plurality of virtual network function instances 111, 112, 121, 122, on the other hand, is schematically shown, illustrating a first embodiment of the present invention. Likewise, in FIG. 4, the communication or the interworking between the shared database functionality 130, on the one hand, and a plurality of virtual network function instances 111, 112, 121, 122, on the other hand, is schematically shown, illustrating a second embodiment of the present invention.

According to both embodiments, the shared database functionality 130 comprises subscription data 131, session data 132 and/or call state data 133. Typically, the virtual network function instances 111, 112, 121, 122 are related to one application server functionality, or to different application server functionalities. In the exemplary representation of FIGS. 3 and 4, a first virtual network function instance 111, a second virtual network function instance 112, a third virtual network function instance 121, and a fourth virtual network function instance 122 are schematically shown. In the exemplary representation of FIGS. 3 and 4, a first application server functionality and a second application server functionality are considered. According to an exemplary embodiment, the first and second virtual network function instances 111, 112 are related to (or are enabled to provide the functionality or functionalities of) the first application server functionality, and the third and fourth virtual network function instances 121, 122 are related to (or are enabled to provide the functionality or functionalities of) the second application server functionality.

According to the first embodiment (shown in FIG. 3), the plurality of virtual network function instances 111, 112, 121, 122 are stateless virtual network function instances, i.e. in case of, e.g., a failure of one of the plurality of virtual network function instances 111, 112, 121, 122, another of the plurality of virtual network function instances 111, 112, 121, 122 resumes its functionality via a sort of handover procedure—especially of the call state data 133—between the virtual network function instances involved. Thereby, all of the subscription data 131, session data 132 and/or call state data 133 (required for the other virtual network function instance to take over the functionality of the failed (or otherwise terminated virtual network function instance)) are stored in (or at least available from) the shared database functionality 130.

According to the second embodiment (shown in FIG. 4), the plurality of virtual network function instances 111, 112, 121, 122 are also more or less stateless virtual network function instances, however, the virtual network function instances 111, 112, 121, 122 comprise cached information 1331, 1332, 1333, 1334, wherein the cached information 1331, 1332, 1333, 1334 relates to the changed or updated subscription data 131, session data 132 and/or call state data 133, and especially related to changed or updated call state data 133. First cached information 1331 is related to the first virtual network function instance 111, second cached information 1332 is related to the second virtual network function instance 112, third cached information 1333 is related to the third virtual network function instance 121, and fourth cached information 1334 is related to the fourth virtual network function instance 122. According to the second embodiment of the present invention, perhaps not literally all of the subscription data 131, session data 132 and/or call state data 133 (required for the other virtual network function instance to take over the functionality of the failed (or otherwise terminated virtual network function instance)), but at least the most important part thereof are stored in (or at least available from) the shared database functionality 130. The part of the subscription data 131, session data 132 and/or call state data 133 (especially mostly call state data) that is stored within the terminated virtual network function instance (i.e. responsible for conducting the considered (application server) functionality prior to the handover, and hence, being terminated for reasons of failure or for other reasons) are not available to the new virtual network function instance (taking over from the terminated virtual network function instance), however, according to the present invention, this does not lead to an important loss of functionality, especially not to a call failure with respect to the user equipment 20, or to an important (and hence recognizable) delay regarding performing the communication service towards the user equipment 20, i.e. the new virtual network function instance of the plurality of virtual network function instances 111, 112, 121, 122 resumes the functionality (of the terminated virtual network function instance) via likewise a sort of handover procedure.

Hence, according to the present invention and via the shared database functionality 130, it is advantageously possible to provide a distributed cloud database as a service such that all the core components of the telecommunications network 100 are provided within the cloud (i.e. "cloudified") . The shared database functionality 130 provides a shared data layer for all types of application server functionalities (or virtual network functions) in order to provide to the respective virtual network function instances the subscription data 131, the session data 132 and/or the call state data 133 in stateful resiliency, i.e. especially the call state data 133 or the state information of the virtual network function instances 111, 112, 121, 122 are stored within the shared database functionality 130. According to the present invention, stateful resiliency to the virtual network function instances ensures that nothing is lost in case of scaling operations (in or out scaling) and in case of failures, hence compliance with ETSI GS NFV R001 Resiliency Requirements is assured.

According to the present invention, obstacles regarding virtual network function scalability and redundancy demands are overcome. Furthermore, a remarkable reduction in virtual network function dimensioning is possible, and, hence, as well a reduced total cost of ownership. Additionally, improved customer experience (e.g. in terms of a reduction of down times or service interruptions) is likewise possible according to the present invention. It is furthermore advantageously possible according to the present invention that a single point of provisioning as well as a real time capability for fulfillment and self-service is possible to realize. Furthermore according to the present invention, a simplified, harmonized and seamless identity management across all types of access is advantageously possible according to the present invention. The shared database functionality 130 furthermore provides the advantage of ensuring data consistency by one single logical entity of truth (especially when compared to several stores to be held in sync by operational support services (OSS). According to the present invention, it is advantageously possible to enhance product innovation by true Fixed/Mobile convergence (FMC), i.e. it is possible to provide new products and services more quickly and more reliably. Additionally, an integrated data mining functionality enables analytics based on full information about each single user provided by one source.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

The invention claimed is:

1. A method for processing of network communication between a telecommunications network and a user equipment, comprising:
    receiving, by a first virtual network function instance of a plurality of virtual network function instances, from a shared database functionality of the telecommunications network, data required to be available to at least the first virtual network function instance for the telecommunication network to provide a communication service to the user equipment, wherein at least one application server functionality of the telecommunications network is realized via the plurality of virtual network function instances, wherein the shared database functionality comprises subscription data, session data and call state data for providing a plurality of communication services to the user equipment, and wherein the requuired data for providing the communication service is data out of the subscription data, session data and call state data of the shared database functionality;
    based on a change being applied to the required data for providing the communication service, transmitting, by the first virtual network function instance, a changed or updated version of the required data providing the communcation service to the shared database functionality; and
    based on failure of the first virtual network function instance, and/or transfer of the functionality of the first virtual network function instance, resuming, by a second virtual network function instance out of the plurality of virtual network function instances the functionality of the first virtual network function instance using the changed or updated version of the required data for providing the communication service;
    wherein the plurality of virtual network function instances comprise cached information, wherein the cached information relates to the changed or updated version of the required data for providing the communication service.

2. The method according to claim 1, wherein the call state data relates to a call or communication session corresponding to the user equipment, and wherein the call state data is modified in the course of the call or communication session.

3. The method according to claim 1, wherein the plurality of virtual network function instances are stateless virtual network function instances, wherein based on failure of the first virtual network function instance, the second virtual network function instance resumes the functionality of the first virtual network function instance via a handover procedure between the first virtual network function instance and the second virtual network function instance.

4. The method according to claim 1, wherein the shared database functionality provides a single point of provisioning and ensures data consistency based on providing one single logical entity of truth.

5. The method according to claim 1, wherein the telecommunications network comprises—besides the at least one application server functionality—further application server functionalities, wherein each of the further application server functionalities is realized via a plurality of further virtual network function instances.

6. A telecommunications network for processing of network communication between the telecommunications network and a user equipment via wherein the telecommunications network comprises:
    at least one application server functionality realized via a plurality of virtual network function instances, wherein the plurality of virtual network function instances include a first virtual network function instance and a second virtual network function instance; and
    a shared database functionality, comprising subscription data, session data and call state data for providing a plurality of communication services to the user equipment;
    wherein the shared database functionality is configured to transmit data required to be available to at least the first virtual network function instance—for the telecommunication network to provide a communication service to the user equipment—to the first virtual network function instance, wherein the required data for providing the communication service is data out of the subscription data, session data and call state data of the shared database functionality;
    wherein the first virtual network function instance is configured, based on a change being applied to the required data for prividing the communication service to transmit a changed or updated version of the required data for providing communcation service to the shared database functionality;
    wherein the second virtual network function instance is configured, based on failure of the first virtual network function instance and/or transfer of the functionality of the first virtual network function instance, to resume the functionality of the first virtual network function instance using the changed or updated version of the required data for providing the communication service; and
    wherein the plurality of virtual network function instances comprise cached information, wherein the cached information relates to the changed or updated version of the required data for providing the communication service.

7. The telecommunications network according to claim 6, wherein the call state data relates to a call or communication session corresponding to the user equipment, and wherein the call state data is modified in the course of the call or communication session.

8. The telecommunications network according to claim 6, wherein the plurality of virtual network function instances are stateless virtual network function instances, and wherein the second virtual network function instance is configured, based on failure of the first virtual network function instance, the functionality of the first virtual network function instance via a handover procedure between the first virtual network function instance and the second virtual network function instance.

9. The telecommunications network according to claim 6, wherein the telecommunications network further comprises:
 a plurality of physical machines located in a plurality of data centers, wherein the plurality of virtual network function instances and/or the shared database functionality are supported by the physical machines within the plurality of data centers, and wherein the shared database functionality involves data centers located in a geographically distributed manner.

10. One or more non-transitory computer-readable mediums having processor-executable instructions stored thereon for processing of network communication between a telecommunications network and a user equipment wherein the processor-executable instructions, when executed, facilitate:
 receiving, by a first virtual network function instance of a plurality of virtual network function instances, from a shared database functionality of the telecommunications network, data required to be available to at least the first virtual network function instance for the telecommunication network to provide a communication service to the user equipment, wherein at least one application server functionality of the telecommunications network is realized via the plurality of virtual network function instances, wherein the shared database functionality comprises subscription data, session data and call state data for providing a plurality of communication services to the user equipment, and wherein the required data for providing the communication service is data out of the subscription data, session data and call state data of the shared database functionality;
 based on a change being applied to the required data for providing the communication service, transmitting, by the first virtual network function instance, a changed or updated version of the required data for providing the communication service to the shared database functionality; and
 based on failure of the first virtual network function instance and/or based on transfer of the functionality of the first virtual network function instance, resuming, by a second virtual network function instance out of the plurality of virtual network function instances the functionality of the first virtual network function instance using the changed or updated version of the required data for providing the communication service;
 wherein the plurality of virtual network function instances comprise cached information, wherein the cached information relates to the changed or updated version of the required data for providing the communication service.

* * * * *